(12) United States Patent
Zhang

(10) Patent No.: US 9,846,330 B2
(45) Date of Patent: Dec. 19, 2017

(54) DISPLAY PANEL, DISPLAY MODULE AND DISPLAY METHOD THEREOF, AND DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu (CN)

(72) Inventor: Zihe Zhang, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu (CN)

(*) Notice: Subject to any disclaimer, the term of this patent is extended or adjusted under 35 U.S.C. 154(b) by 0 days.

(21) Appl. No.: 15/312,949

(22) PCT Filed: Mar. 1, 2016

(86) PCT No.: PCT/CN2016/075203
§ 371 (c)(1),
(2) Date: Nov. 21, 2016

(87) PCT Pub. No.: WO2017/045373
PCT Pub. Date: Mar. 23, 2017

(65) Prior Publication Data
US 2017/0285405 A1 Oct. 5, 2017

(30) Foreign Application Priority Data
Sep. 17, 2015 (CN) .......................... 2015 1 0595373

(51) Int. Cl.
*G09G 3/34* (2006.01)
*G02F 1/1335* (2006.01)
*G09G 3/36* (2006.01)

(52) U.S. Cl.
CPC ..... *G02F 1/133602* (2013.01); *G09G 3/3406* (2013.01); *G09G 3/36* (2013.01);
(Continued)

(58) Field of Classification Search
CPC ............ G02F 1/133602–2001/133613; G09G 3/3406; G09G 2320/0626; G09G 2360/14–2360/148
(Continued)

(56) References Cited

U.S. PATENT DOCUMENTS

2005/0117096 A1 6/2005 Voloschenko et al.

FOREIGN PATENT DOCUMENTS

CN 1987978 A 6/2007
CN 101647049 A 2/2010
(Continued)

OTHER PUBLICATIONS

China PCT International Search Report, Application No. PCT/CN2016/075203, dated Jun. 15, 2016, 14 pps.
(Continued)

*Primary Examiner* — Michael Pervan
(74) *Attorney, Agent, or Firm* — Armstrong Teasdale LLP

(57) ABSTRACT

A display panel, a display module and a display method thereof, and a display device are provided. The display module includes a backlight module and a display panel. A driving circuit and a photosensor are provided on the display panel, and the photosensor is electrically connected with the driving circuit. When the backlight module receives a backlight control signal, the backlight module emits light based on a light emission frequency indicated by the backlight control signal, and the backlight control signal is converted from a display signal output from a host. The photosensor detects an optical signal generated by the backlight module, converts the optical signal into an electric signal, and transmits the electric signal to the driving circuit, such that the driving circuit drives the display panel to display an image.

19 Claims, 2 Drawing Sheets

(52) U.S. Cl.
CPC ............ *G02F 2001/133612* (2013.01); *G09G 2320/0626* (2013.01); *G09G 2360/14* (2013.01)

(58) Field of Classification Search
USPC ................ 345/102, 204, 207; 362/97.1–97.4
See application file for complete search history.

(56) References Cited

FOREIGN PATENT DOCUMENTS

| | | |
|---|---|---|
| CN | 201503685 U | 6/2010 |
| CN | 202178042 U | 3/2012 |
| CN | 202332232 U | 7/2012 |
| CN | 102737602 A | 10/2012 |
| CN | 103091886 A | 5/2013 |
| CN | 203097679 U | 7/2013 |
| CN | 103646613 A | 3/2014 |
| CN | 105093601 A | 11/2015 |
| JP | 2007316499 A | 12/2007 |

OTHER PUBLICATIONS

English Translation of China PCT International Written Opinion, Application No. PCT/CN2016/075203, dated Jun. 15, 2016, 7 pps.
China First Office Action, Application No. 201510595373.2, dated Aug. 18, 2017, 11 pgs.: with English translation.

DISPLAY PANEL, DISPLAY MODULE AND DISPLAY METHOD THEREOF, AND DISPLAY DEVICE

CROSS REFERENCE TO RELATED APPLICATIONS

This application is a National Stage entry of PCT/CN2016/075203 filed Mar. 1, 2016, which claims priority to Chinese Patent Application No. 201510595373.2 filed on Sep. 17, 2015, the disclosures of which are incorporated herein in their entirety as part of the present application.

BACKGROUND

Exemplary embodiments of the present disclosure relate to a display panel, a display module and a display method thereof, and a display device.

With the rapid development of display technology, liquid crystal display (LCD) is widely used in various electronic equipments because of its low power consumption and other characteristics. LCD display module is an important part of the liquid crystal display, therefore, structural composition and operating manners of the LCD display module are widely concerned in the industry.

The display module in the prior art mainly includes a display panel, a backlight module and a flexible circuit board. A driving circuit is provided on the display panel, and a signal line for connecting a host with the driving circuit is provided on the flexible circuit. In this structure, the host sends a display signal to the driving circuit through the signal line, and the driving circuit sends the display signal to the display panel, such that the display panel display an image. Here, the display signal includes pixel information of an image to be displayed and timing information when the signal is displayed and so on.

The prior art has at least the following disadvantages:

In the existing display module, the host needs to send the display signal to the driving circuit through the signal line, while the signal line is provided on the flexible circuit board, which causes a relatively large area of the flexible circuit board. For example, taking MIPI (Mobile Industry Processor Interface) protocol as an example, when the resolution reaches WQHD (i.e., the resolution is 2560×1440), the host needs to transmit the display signal to the driving circuit through 10 pairs of differential signal lines, thus the signal lines may occupy a large area of flexible circuit board.

BRIEF DESCRIPTION

Exemplary embodiments of the present disclosure provide a display panel, a display module and a display method thereof, and a display device. By providing a photosensor on the display panel and obtaining an electric signal of a driving circuit by detecting the optical signal by the photosensor, it is possible to avoid providing a larger number of signal lines for transmitting display signals on a flexible wiring board connecting a host and the driving circuit, such that the area of the flexible wiring board can be reduced.

According to a first aspect of an embodiment of the present disclosure, a display panel is provided, on which a photosensor is provided for detecting an optical signal and converting the optical signal into an electric signal to drive the display panel to display an image, wherein the optical signal is generated based on a display signal.

According to a second aspect of an embodiment of the present disclosure, a display module is provided, the display module includes a backlight module and a display panel, a driving circuit and a photosensor are provided on the display panel, and the photosensor is electrically connected with the driving circuit, wherein, when the backlight module receives a backlight control signal, the backlight module generates an optical signal based on the backlight control signal, the backlight control signal is converted from a display signal output from a host, the photosensor detects the optical signal, converts the optical signal into an electric signal, and transmits the electric signal to the driving circuit, such that the driving circuit drives the display panel to display an image.

According to an embodiment of the present disclosure, the display module further includes a signal converter and a backlight control circuit, wherein, the signal converter is electrically connected with the host, and the backlight control circuit is electrically connected with the signal converter and the backlight module; the signal converter receives the display signal transmitted from the host, converts the display signal into the backlight control signal, and transmits the backlight control signal to the backlight module by the backlight control circuit.

According to an embodiment of the present disclosure, the host includes a signal converter and a backlight control circuit, the signal converter is electrically connected with the backlight control circuit, and the backlight control circuit is electrically connected with the backlight module. The signal converter converts the display signal into the backlight control signal, and transmits the backlight control signal to the backlight module by the backlight control circuit.

According to an embodiment of the present disclosure, the backlight module is of a direct type or an edge type.

According to an embodiment of the present disclosure, the photosensor is provided at a position close to the driving circuit.

According to an embodiment of the present disclosure, the display module further includes a flexible wiring board connecting the driving circuit with the host, and the host supplies power to the driving circuit by the flexible wiring board.

According to an embodiment of the present disclosure, the display signal includes a data line signal and a gate line scanning signal.

According to a third aspect of an embodiment of the present disclosure, a display device is provided, which includes any one display module described as above.

According to a fourth aspect of an embodiment of the present disclosure, a display method is provided, which is applied to any one display module described as above, the display method includes receiving a backlight control signal and emitting light based on a light emission frequency indicated by the backlight control signal by a backlight module, the backlight control signal is converted from a display signal output from a host, and the backlight control signal carries the light emission frequency, detecting an optical signal generated by the backlight module based on the backlight control signal, converting the optical signal into an electric signal, and transmitting the electric signal to a driving circuit by a photosensor, such that the driving circuit drives a display panel to display an image.

According to an embodiment of the present disclosure, before receiving the backlight control signal by the backlight module, the signal converter receives the display signal transmitted from the host, converts the display signal into the backlight control signal, and transmits the backlight control signal to the backlight module by the backlight control circuit.

According to an embodiment of the present disclosure, converting the display signal into the backlight control signal includes converting the display signal into a first square wave signal vibrated at a designated frequency, the first square wave signal being used as the backlight control signal, wherein the first square wave signal includes a first level and a second level.

According to an embodiment of the present disclosure, emitting light based on the light emission frequency indicated by the backlight control signal includes emitting light based on the designated frequency, and in the case of being at the first level of the first square wave signal, the backlight module does not emit light. In the case of being at the second level of the first square wave signal, the backlight module emits light.

According to an embodiment of the present disclosure, detecting the optical signal generated by the backlight module based on the backlight control signal and converting the optical signal into the electric signal by the photosensor includes when the photosensor detects that the backlight module emits light, a first electric signal is obtained, when the photosensor detects that the backlight module does not emit light, a second electric signal is obtained, the photosensor generates the electric signal based on the first electric signal and the second electric signal.

According to an embodiment of the present disclosure, converting the display signal into the backlight control signal includes converting the display signal to a second square wave signal alternately vibrated at a first frequency and a second frequency, the second square wave signal being used as the backlight control signal, wherein the second square wave signal includes a third level and a fourth level.

According to an embodiment of the present disclosure, emitting light based on the light emission frequency indicated by the backlight control signal includes emitting light based on the first frequency and the second frequency, and in the case of being at the third level of the second square wave signal, the backlight module does not emit light. In the case of being at the fourth level of the second square wave signal, the backlight module emits light.

According to an embodiment of the present disclosure, detecting the optical signal generated by the backlight module based on the backlight control signal and converting the optical signal into the electric signal by the photosensor includes when the photosensor detects that the backlight module emits light at the first frequency, a third electric signal is obtained, when the photosensor detects that the backlight module emits light at the second frequency, a fourth electric signal is obtained, the photosensor generates the electric signal based on the third electric signal and the fourth electric signal.

BRIEF DESCRIPTION OF THE DRAWINGS

In order to more clearly illustrate the technical solutions in embodiments of the present disclosure or in the prior art, the drawings to be used in the description of the embodiments or in the prior art will be briefly introduced below. Apparently, the drawings in the following description are only for some embodiments of the present disclosure, those of ordinary skill in the art may also obtain other drawings from these drawings, without creative efforts.

DETAILED DESCRIPTION

The technical solution in embodiments of the present disclosure will be clearly and completely described in combination with the drawings in the embodiments of the present disclosure. Apparently, the described embodiments are merely part of the embodiments of the present disclosure, instead of all the embodiments. All other embodiments obtained by those skilled in the art based on the embodiments of the present disclosure without creative work fall within the scope of the present disclosure.

In the description of the disclosure, it is to be noted that the orientation or position relations indicated by the terms "upper", "lower", "top", "bottom" and the like are orientation or position relations based on the drawings. They are only used for facilitating and simplifying the description of the disclosure, rather than indicating or implying that the indicated devices or elements must have a specific orientation and are constructed and operated in a specific orientation, and therefore cannot be construed as limiting the disclosure.

Further, in the disclosure, the terms "first", "second" and "third" are used for purposes of illustration only and are not to be taken as an indication or suggestion of relative importance. The term "a plurality of" refers to two or more than two, unless otherwise specifically defined.

Figure 1:
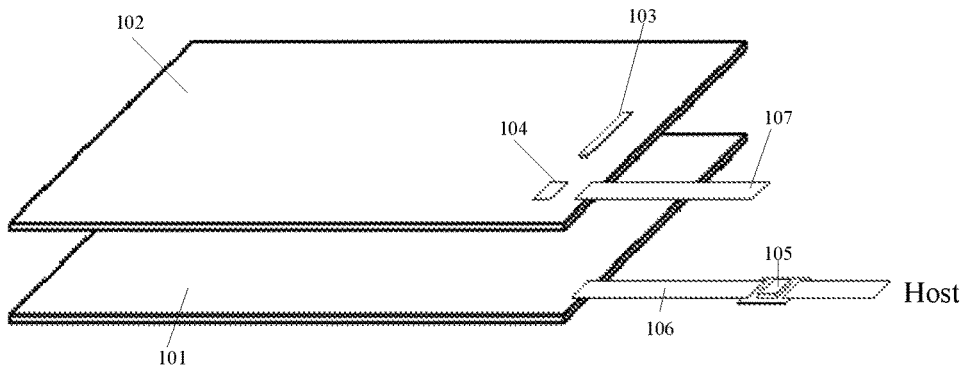
FIG. 1 is a structural schematic view showing a display module according to an exemplary embodiment of the present disclosure.

FIG. 1 is a structural schematic view showing a display module according to an embodiment of the present disclosure. As shown in FIG. 1, the display module includes a backlight module 101 and a display panel 102. A driving circuit 103 and a photosensor 104 are provided on the display panel 102, and the photosensor 104 is electrically connected with the driving circuit 103.

When the backlight module 101 receives a backlight control signal, the backlight module 101 generates an optical signal based on the backlight control signal, the backlight control signal is converted from a display signal output from a host. The photosensor 104 detects the optical signal transmitted from the backlight module 101, converts the optical signal into an electric signal, and transmits the electric signal to the driving circuit 103, such that the driving circuit 103 drives the display panel 102 to display an image.

In an embodiment of the present disclosure, since the optical signal needs to be transmitted by the flicker of the backlight module 101, the display module in an embodiment of the present disclosure includes, but is not limited to, a display module in a liquid crystal display, i.e., the display module may be a LCD display module.

After the driving circuit 103 receives the electric signal, if the electric signal is not a voltage signal that the driving circuit 103 can directly use, the driving circuit 103 may decode the electric signal by a specified protocol to convert it into an usable voltage signal, such that the display panel 102 displays different gray levels. Here, the display panel includes, but is not limited to, a liquid crystal panel. When the driving circuit drives the liquid crystal panel to display different gray levels, liquid crystal molecules can be driven to deflect in different directions, in order to achieve an image display.

According to an embodiment of the present disclosure, the host may be a main board of the display device. When the display device displays an image, the display signal needs to be transmitted to the driving circuit 103 by the host. The display signal may include a data line signal and a gate line scanning signal. The data line signal may include pixel information of an image to be displayed, and the gate line scanning signal may include control information. In an embodiment of the present disclosure, the host does not directly transmit the display signal to the driving circuit 103 through the flexible wiring board, but instead converts the display signal into the backlight control signal, and then transmits the backlight control signal to the backlight module 101. The light emission frequency of the backlight module 101 can be carried in the backlight control signal. The backlight module 101 receives the backlight control signal and emits light according to the light emission frequency carried therein. The photosensor 104 detects the optical signal emitted from the backlight module 101 and transmits the optical signal to the driving circuit 103, thereby achieving the transmission of the display signal to the driving circuit 103.

As for the form of the backlight module 101, embodiments of the present disclosure are not particularly limited. The backlight module 101 may be of a direct type or an edge type. When the backlight module 101 is of the direct type, it may include a light strip and an optical film. When the backlight module 101 is of an edge type, it may include a light guide plate, a light strip, and an optical film.

According to an embodiment of the present disclosure, when converting the display signal into the backlight control signal, there are two manners including but not limited to the following manners. In a first manner, the display module includes a signal converter 105 and a backlight control circuit 106. The signal converter 105 is electrically connected with the host, and the backlight control circuit 106 is electrically connected with the signal converter 105 and the backlight module 101.

On this basis, after the host transmits the display signal to the signal converter 105, the signal converter 105 receives the display signal transmitted from the host and converts the display signal into the backlight control signal, and further transmits the same to the backlight module 101 through the backlight control circuit 106. According to an embodiment of the present disclosure, the backlight control circuit may be a flexible wiring board. In this case, the signal converter 105 and the backlight control circuit 106 in FIG. 1 may be provided in the display module.

In a second manner, the signal converter 105 and the backlight control circuit 106 are provided in the host, the signal converter 105 is electrically connected with the backlight control circuit 106, and the backlight control circuit 106 is electrically connected with the backlight module 101.

On this basis, the signal converter 105 in the host converts the display signal into the backlight control signal, and then transmits the backlight control signal to the backlight module 101 through the backlight control circuit 106. The backlight module 101 receives the backlight control signal transmitted from the backlight control circuit 106.

Moreover, the positional relationship between the driving circuit 103 and the photosensor 104 is not particularly limited in the embodiment of the present disclosure. The photosensor 104 may be provided at any position on the display panel 102. However, since the driving circuit 103 is electrically connected to the photosensor 104, in order to conserve the wire resources, the photosensor 104 can be provided at a position close to the driving circuit 103. It is to be noted that "close to" as used herein means that the distance between the driving circuit 103 and the photosensor 104 is less than a preset threshold. The specific value of the preset threshold may be set as required, and the embodiment of the present disclosure is not particularly limited thereto.

Further, in order to ensure proper operation of the driving circuit 103, the host should also supply power to the driving circuit 103. Therefore, in an embodiment of the present disclosure, the display module further includes a flexible wiring board 107 for connecting the driving circuit 103 with the host, and the host supplies power to the driving circuit 103 through the flexible wiring board 107.

In the display module according to an embodiment of the present disclosure, since the transmission of the display signal to the driving circuit 103 by the host does not need a signal line between the host and the driving circuit 103, there is no need to provide an excessive number of single lines on the flexible wiring board 107 connecting the host with the driving circuit 103, such that the area of the flexible wiring board 107 can be reduced. In addition, with the rapid development of the display technology, in order to increase the area of displaying an image on the display device as much as possible, many LCD display devices require a narrow bezel. With the display module provided by the embodiments of the present disclosure, since there is no need to prepare an excessive number of signal lines on the bezel of the display module, it is possible to reduce or remove the bezel region of the flexible wiring board, thereby reducing the size of the bezel of the LCD.

According to an embodiment of the present disclosure, a display panel is also provided, on which a photosensor is provided for detecting an optical signal and converting the optical signal into an electric signal to drive the display panel to display an image, wherein the optical signal is generated based on a display signal.

The specific content of the display signal has been described in the embodiment of FIG. 1, and the details of the display signal are described in detail with reference to the embodiment of FIG. 1, thus the description thereof will not be repeated here.

In addition, when the optical signal is generated based on the display signal, as described in the embodiment described above with reference to FIG. 1, the display signal is converted into a backlight control signal by the signal converter 105, and then transmitted to the backlight module 101 through the backlight control circuit 106, such that the backlight module 101 generates an optical signal in accordance with the backlight control signal, or without being based on the backlight module 101, the optical signal may be directly generated by another light source based on the display signal. The embodiment of the present disclosure does not limit the manner in which an optical signal is generated based on a display signal.

The display panel according to the embodiment of the present disclosure detects an optical signal generated based on a display signal by a photosensor prepared thereon, and then converts the optical signal into an electric signal to drive the display panel to display an image, thus it is possible to avoid providing a larger number of signal lines for transmitting the display signal on the flexible wiring board connecting the host with the display panel, such that the area of the flexible wiring board can be reduced.

Figure 2:
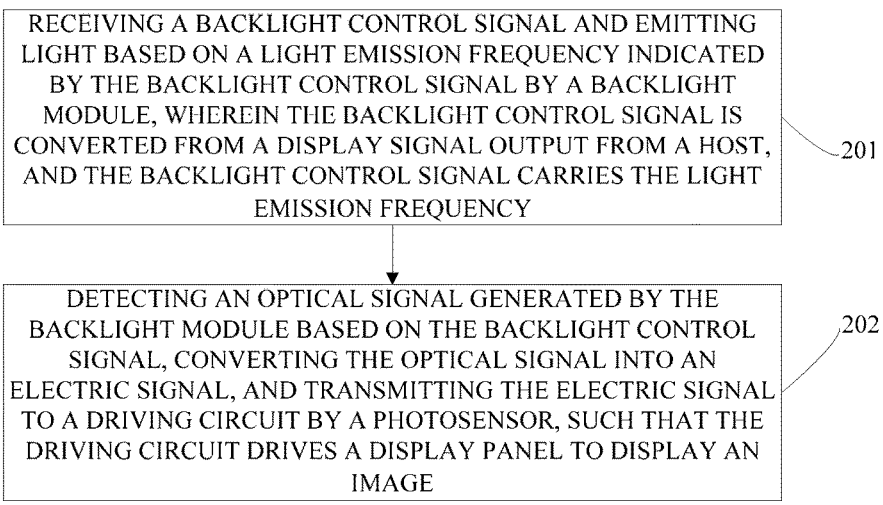
FIG. 2 is a flowchart showing a display method according to an exemplary embodiment of the present disclosure.

FIG. 2 is a flowchart showing a display method according to an exemplary embodiment of the present disclosure, and the display method shown in FIG. 2 may be applied to the display module in the embodiment of FIG. 1.

As shown in FIG. 2, the display method according to an embodiment of the present disclosure comprises:

Step 201: receiving a backlight control signal and emitting light based on a light emission frequency indicated by the backlight control signal by a backlight module, wherein the backlight control signal is converted from a display signal output from a host, and the backlight control signal carries the light emission frequency.

Based on the display module shown in FIG. 1, before receiving the backlight control signal by the backlight module, the method includes transmitting the backlight control signal to the backlight module 101 by a backlight control circuit 106 after receiving the display signal sent from the host and converting the display signal into the backlight control signal by a signal converter 105. That is to say, the display module in an embodiment of the present disclosure further includes a signal converter 105 and a backlight control circuit 106, the signal converter 105 converts the display signal sent from the host into a backlight control signal, and then sends the backlight control signal back to the backlight module 101 through the backlight control circuit 106.

Of course, in connection with the contents of the above-described embodiment, the host may include a signal converter 105 and a backlight control circuit 106. On this basis, the host directly converts the display signal into the backlight control signal through its signal converter 105, and further transmits the backlight control signal to the backlight module 101 through its backlight control circuit 106.

The details of the display signal and the backlight control signal have been described in detail in the above embodiments, and will not be described in detail herein. Further, the specific configuration and function of the display module have also been explained in the above-described embodiments, and the description thereof will not be repeated here.

It is to be noted that, in an embodiment of the present disclosure, the light emission frequency carried in the backlight control signal is the frequency at which the backlight module flashes, wherein the light emission frequencies carried in the backlight control signal may be the same frequency or different frequencies. In connection with this section, when converting the display signal into the backlight control signal and the backlight module emits light according to the light emission frequency indicated by the backlight control signal, there are included but not limited to the following two manners.

A first manner includes converting the display signal into a first square wave signal vibrated at a designated frequency, the first square wave signal being used as the backlight control signal, wherein the first square wave signal includes a first level and a second level, here, the backlight module emits light based on the designated frequency, and in the case of being at the first level of the first square wave signal, the backlight module does not emit light. In the case of being at the second level of the first square wave signal, the backlight module emits light.

According to an embodiment of the present disclosure, the designated frequency is the light emission frequency of the backlight module, and in this case, the backlight module emits light at the same frequency (for example, the designated frequency). The designated frequency may be relatively high, typically above 106 Hz. On this basis, when the backlight module flashes at the designated frequency, it cannot be perceived by the human eye, and thus it will not affect the display effect. Therefore, the transmission of the display signal through the backlight module can be realized without affecting the user's visual experience.

Embodiments of the present disclosure are not particularly limited with respect to specific values of the first level and the second level. For example, the first level may be "0" in the binary number, and the second level is "1" in the binary number, and vice versa.

Figure 3:
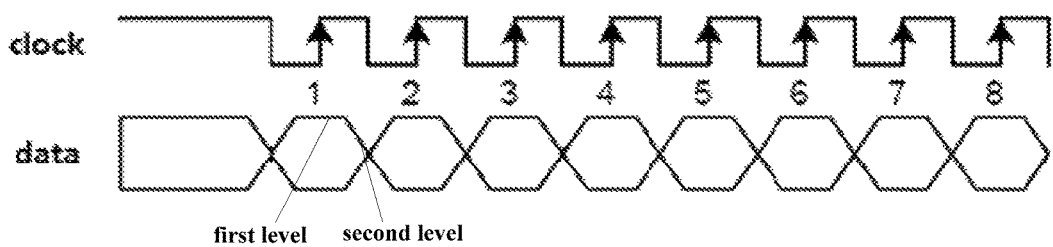
FIG. 3 is a schematic view showing a backlight control signal according to an exemplary embodiment of the present disclosure.

As shown in FIG. 3 which shows a schematic view of a backlight control signal according to an embodiment of the present disclosure, the backlight control signal (data) in FIG. 3 is the first square wave signal. As shown in FIG. 3, when the display signal is converted into the backlight control signal, it can be achieved based on the built-in clock signal, and the clock in FIG. 3 is an internal clock signal.

A second manner includes converting the display signal into a second square wave signal alternately vibrated at a first frequency and a second frequency, the second square wave signal being used as the backlight control signal, wherein the second square wave signal includes a third level and a fourth level, here, the backlight module will emit light alternately at the first frequency and the second frequency, and in the case of being at the third level of the second square wave signal, the backlight module does not emit light. In the case of being at the fourth level of the second square wave signal, the backlight module emits light.

In this case, the backlight module emits light alternately at the first frequency and the second frequency, wherein the first frequency and the second frequency are relatively high, usually above 106 Hz. Embodiments of the present disclosure are not particularly limited with respect to specific values of the third level and the fourth level. For example, the third level may be "0" in the binary number, and the fourth level is "1" in the binary number, and vice versa.

Figure 4:
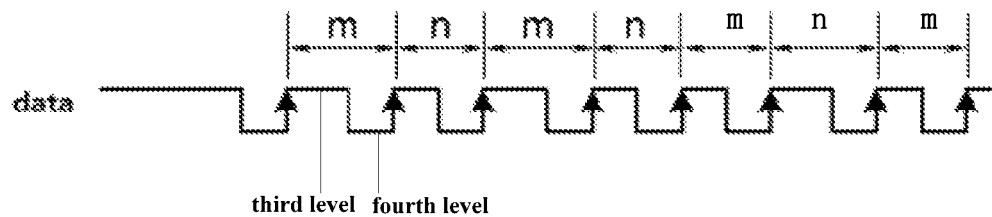
FIG. 4 is a schematic view showing a backlight control signal according to an exemplary embodiment of the present disclosure.

As shown in FIG. 4 which shows a schematic view of a backlight control signal according to an embodiment of the present disclosure, the backlight control signal (data) in FIG. 4 is the second square wave signal, the first frequency in FIG. 4 may be 1/m, and the second frequency may be 1/n.

Step 202: detecting an optical signal generated by the backlight module based on the backlight control signal, converting the optical signal into an electric signal, and transmitting the electric signal to a driving circuit by a photosensor, such that the driving circuit drives a display panel to display an image.

According to an embodiment of the present disclosure, after the driving circuit 103 receives the electric signal, if the electric signal is not a voltage signal usable by the driving circuit, the driving circuit may decode the electric signal by a specified protocol to convert it into a voltage signal that the driving circuit itself can use, such that the display panel 102 may be driven to perform a display of different gray levels. Here, the relationship between the voltage signals which can be used by the electric signal and the driving circuit is related to the contents of the specified protocol, and the embodiment of the present disclosure does not restrict the contents of the specified protocol. The principle of the driving circuit for driving the display panel to display an image is the same as that of the prior art in which the driving circuit drives the display panel to display an image in accordance with the display signal, and this is not described in detail in the embodiment of the present disclosure.

In addition, in combination with the above-described manner of converting the display signal to the backlight control signal and that the backlight module emits light at the light emission frequency indicated by the backlight control signal, when the photosensor detects the optical signal emitted from the backlight module according to the control signal and converts the optical signal into the electric signal, there are also two manners as follows.

In a first manner, when the photosensor detects that the backlight module emits light, a first electric signal is obtained. When the photosensor detects that the backlight module does not emit light, a second electric signal is obtained. The photosensor generates the electric signal based on the first electric signal and the second electric signal.

Figure 5:
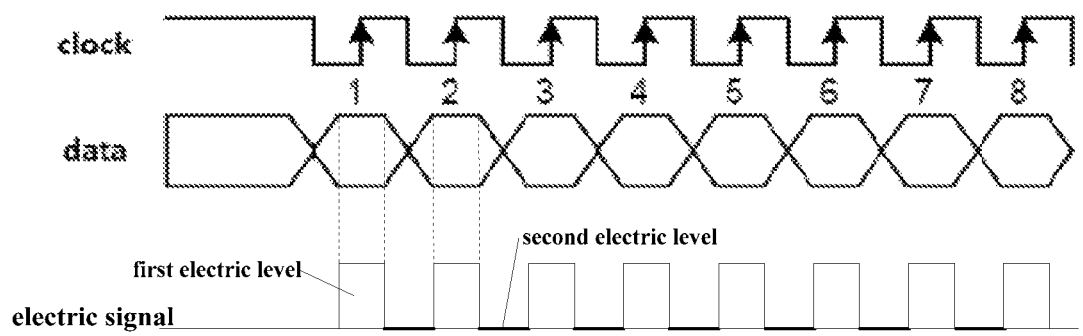
FIG. 5 is a schematic view showing an electric signal according to an exemplary embodiment of the present disclosure.

This manner is a specific realization of the photosensor to generate the electric signal with respect to the first square wave signal. According to an embodiment of the present disclosure, when the photosensor generates an electric signal transmitted to the driving circuit in accordance with the first electric signal and the second electric signal, it is formed by combining the first electric signal and the second electric signal. FIG. 5 is a schematic view showing an electric signal according to an exemplary embodiment of the present disclosure. In order to facilitate understanding of the relationship between the backlight control signal (data) and the electric signal, the relationship between the backlight control signal (data) and the electric signal is shown in FIG. 5 with a dotted line.

In a second manner, when the photosensor detects that the backlight module emits light at the first frequency, a third electric signal is obtained. When the photosensor detects that the backlight module emits light at the second frequency, a fourth electric signal is obtained. The photosensor generates the electric signal based on the third electric signal and the fourth electric signal.

Figure 6:
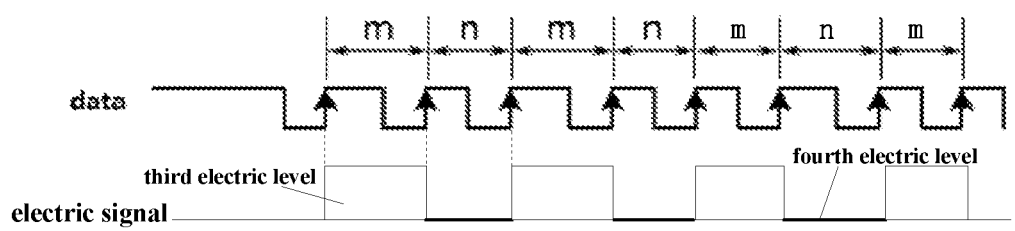
FIG. 6 is a schematic view showing an electric signal according to an exemplary embodiment of the present disclosure.

This manner is a specific realization of the photosensor to generate the electric signal with respect to the second square wave signal. According to an embodiment of the present disclosure, when the photosensor generates an electric signal transmitted to the driving circuit in accordance with the third electric signal and the fourth electric signal, it is formed by combining the third electric signal and the fourth electric signal. FIG. 6 is a schematic view showing an electric signal according to an exemplary embodiment of the present disclosure. In order to facilitate understanding of the relationship between the backlight control signal (data) and the electric signal, the relationship between the backlight control signal (data) and the electric signal is shown in FIG. 6 with a dotted line.

With the display method according to an embodiment of the present disclosure, by providing the photosensor on the display panel and obtaining the electric signal of the driving circuit by detecting the optical signal by the photosensor, it is possible to avoid providing a larger number of signal lines for transmitting display signals on a flexible wiring board connecting the host with the driving circuit, such that the area of the flexible wiring board can be reduced.

According to an embodiment of the present disclosure, a display device is also provided, which includes the display module in the above embodiment of FIG. 1. This display device may be any product or component having a display function such as a mobile phone, a tablet PC, a television set, a display, a notebook computer, a desktop computer, a digital photo frame, a navigator and the like.

The above description is only specific embodiments of the disclosure, but the scope of the disclosure is not limited thereto. Changes or replacements within the technical scope of the disclosure, which can be easily acquired by any skilled in the art, should be encompassed within the scope of the disclosure. Accordingly, the scope of the disclosure should be based on the scope of the claims attached.

What is claimed is:

1. A display module comprising a backlight module and a display panel, the display panel comprising a driving circuit and a photosensor and the photosensor is electrically connected with the driving circuit;
    wherein, when the backlight module receives a backlight control signal, the backlight module generates an optical signal based on the backlight control signal, the backlight control signal converted from a display signal output from a host; and
    wherein the photosensor detects the optical signal, converts the optical signal into an electric signal, and transmits the electric signal to the driving circuit, such that the driving circuit drives the display panel to display an image.

2. The display module of claim 1, further comprising a signal converter and a backlight control circuit;
    wherein the signal converter is electrically connected with the host, and the backlight control circuit is electrically connected with the signal converter and the backlight module; and
    wherein the signal converter receives the display signal transmitted from the host, converts the display signal into the backlight control signal, and transmits the backlight control signal to the backlight module by the backlight control circuit.

3. The display module of claim 2, wherein the photosensor is proximate to the driving circuit.

4. The display module of claim 2, wherein the display module further comprises a flexible wiring board connecting the driving circuit with the host, and wherein the host supplies power to the driving circuit by the flexible wiring board.

5. The display module of claim 1, wherein the host comprises a signal converter and a backlight control circuit, wherein the signal converter is electrically connected with the backlight control circuit, wherein the backlight control circuit is electrically connected with the backlight module, and wherein the signal converter converts the display signal into the backlight control signal and transmits the backlight control signal to the backlight module by the backlight control circuit.

6. The display module of claim 5, wherein the display module further comprises a flexible wiring board connecting the driving circuit with the host, and wherein the host supplies power to the driving circuit by the flexible wiring board.

7. The display module of claim 1, wherein the backlight module is one of a direct type and an edge type.

8. The display module of claim 1, wherein the photosensor is proximate to the driving circuit.

9. The display module of claim 1, wherein the display module further comprises a flexible wiring board connecting the driving circuit with the host, and wherein the host supplies power to the driving circuit by the flexible wiring board.

10. The display module of claim 1, wherein the display signal comprises a data line signal and a gate line scanning signal.

11. A display device, comprising the display module of claim 1.

12. A display method for a display module, wherein the display method comprises:

receiving a backlight control signal and emitting light based on a light emission frequency indicated by the backlight control signal by a backlight module, wherein the backlight control signal is converted from a display signal output from a host, and wherein the backlight control signal carries the light emission frequency; and detecting an optical signal generated by the backlight module based on the backlight control signal, converting the optical signal into an electric signal, and transmitting the electric signal to a driving circuit by a photosensor, such that the driving circuit drives a display panel to display an image.

13. The display method of claim 12, wherein before receiving the backlight control signal by the backlight module, the display method further comprises:

transmitting the backlight control signal to the backlight module by a backlight control circuit after receiving the display signal sent from the host and converting the display signal into the backlight control signal by a signal converter.

14. The display method of claim 13, wherein converting the display signal into the backlight control signal comprises:

converting the display signal into a first square wave signal vibrated at a designated frequency, the first square wave signal being used as the backlight control signal, wherein the first square wave signal includes a first level and a second level.

15. The display method of claim 14, wherein emitting light based on the light emission frequency indicated by the backlight control signal comprises:

emitting light by not emitting light when the first square wave signal is at the first level, and emitting light when the first square wave signal is at the second level.

16. The display method of claim 15, wherein detecting the optical signal generated by the backlight module based on the backlight control signal and converting the optical signal into the electric signal by the photosensor comprises:

when the photosensor detects that the backlight module emits light, obtaining a first electric signal;

when the photosensor detects that the backlight module does not emit light, obtaining a second electric signal; and generating the electric signal using the photosensor based on the first electric signal and the second electric signal.

17. The display method of claim 13, wherein converting the display signal into the backlight control signal comprises:

converting the display signal to a second square wave signal alternately vibrated at a first frequency and a second frequency, the second square wave signal being used as the backlight control signal, wherein the second square wave signal includes a third level and a fourth level.

18. The display method of claim 17, wherein emitting light based on the light emission frequency indicated by the backlight control signal comprises:

emitting light based on the first frequency and the second frequency by not emitting light when the second square wave signal is at the third level, and emitting light when the second square wave signal is at the fourth level.

19. The display method of claim 18, wherein detecting the optical signal generated by the backlight module based on the backlight control signal and converting the optical signal into the electric signal by the photosensor comprises:

when the photosensor detects that the backlight module emits light at the first frequency, obtaining a third electric signal;

when the photosensor detects that the backlight module emits light at the second frequency, obtaining a fourth electric signal; and generating the electric signal using the photosensor based on the third electric signal and the fourth electric signal.

* * * * *